United States Patent [19]

Kuniya et al.

[11] 3,871,834

[45] Mar. 18, 1975

[54] CARBON-FIBER-REINFORCED ALUMINUM COMPOSITE MATERIAL

[75] Inventors: Keiichi Kuniya; Hideo Arakawa, both of Hitachi, Japan

[73] Assignee: Hitachi, Ltd., Tokyo, Japan

[22] Filed: Dec. 23, 1971

[21] Appl. No.: 211,177

[30] Foreign Application Priority Data
Dec. 25, 1970 Japan.............................. 45-117612

[52] U.S. Cl..................... 29/183, 29/195 C, 148/34
[51] Int. Cl............................................ B32b 15/14
[58] Field of Search.......... 29/195 C, 197, 180, 183, 29/183.5, 191, 191.2, 191.4; 148/34; 75/138

[56] References Cited
UNITED STATES PATENTS
3,473,900    10/1969    Sara...................................... 29/195

Primary Examiner—L. Dewayne Rutledge
Assistant Examiner—E. L. Weise
Attorney, Agent, or Firm—Craig & Antonelli

[57] ABSTRACT

A carbon-fiber-reinforced aluminum composite material comprises an aluminum matrix containing an alloying element reactive with carbon to form a carbide and carbon fibers having a tensile strength larger than that of the aluminum matrix. The amount of the carbon fibers is larger than the critical volume ratio that is the lower limit required for reinforcing the aluminum matrix. The carbide of the alloying element is formed on the interface between the carbon fibers and the matrix thereby to form a close adherence between the aluminum matrix and the carbon fibers.

23 Claims, 2 Drawing Figures

CARBON-FIBER-REINFORCED ALUMINUM COMPOSITE MATERIAL

BACKGROUND OF THE INVENTION

The present invention relates to an aluminum composite material reinforced with carbon fibers.

In recent years, glass fiber-reinforced plastics have been used in wide applications. The fiber-reinforced plastics have a fatal defect, i.e., lack of heat resistance, and, therefore, the development of metal composite materials reinforced with various fibers is desired.

Since the fiber-reinforced metal composite materials are essentially different from the conventional metal materials in technical aspects with respect to the strength theory, manufacturing etc., many difficult problems must be solved to develope such fiber-reinforced metal composite materials.

The object of development of the fiber-reinforced metal composite materials is to apply them to various fields including aircraft, thermopower equipment and construction material, and in particular, it is desirable to provide a material using aluminum as matrix for use in aircraft because of its light weight.

Among others, a fiber-reinforced aluminum composite material has been extensively investigated and reported. In this material boron fibers have been used as a reinforcing material. However, as the reinforcing material for aluminum, carbon fibers are more suitable than boron fibers because the carbon fibers are more heat resistant, of lower specific gravity, less expensive and more suitable for mass production.

The investigations heretofore made for using carbon fiber have not been successful. This is due to the fact that there is no wettability between the aluminum and carbon fibers.

SUMMARY OF THE INVENTION

It has been found in accordance with this invention that the necessary conditions for the fiber-reinforced metal composite metal material are as follows:

1. Good wettability between the matrix and fiber. An incomplete adherence between the matrix and fiber causes separation between the fibers and the matrix because the stress applied to the composite material cannot be transmitted sufficiently from the matrix to the fiber. Consequently, this results in easy rupture of the composite material. Therefore, an intimate adherence between the fiber and the metal matrix is a fundamental requirement.

2. Fiber content should be larger than the critical volume ratio (Vcrit).

When the fiber content is less than the critical volume ratio, the mechanical strength of the composite material would be lower than that of the matrix itself. As described in "The principles of the fiber reinforcement of metals" by A. Kelly and G. J. Davies, Metallurgical Review, vol. 10, 1–78 (1965), the critical volume ration "Vcrit" is calculated by the following equation:

$Vcrit = \delta_m - \delta_{m=}/\delta_f - \delta_{m=}$

Wherein $\delta_f$ is a tensile strength of fiber, $\delta_m$ a tensile strength of matrix and $\delta_{m=}$ a tensile stress borne by the matrix when the fibers are strained to their ultimate tensile strain.

When the matrix is aluminum and the fibers are carbon fiber, $\delta_{m=}$, $\delta_m$ and $\delta_f$ are respectively about 2.8 kg/mm², 10 kg/mm², and 250 kg/mm². In such case, Vcrit is about 3 percent, and therefore, the carbon fiber of at least 3 percent by volume must be used in order to reinforce the matrix. It goes without saying that aluminum must embrace all the surface of each of carbon fibers. Although an amount of carbon fibers to be used is not limited to a certain amount, the maximum amount of carbon fibers is limited to such an amount that substantially all the gaps between fibers are filled with aluminum.

3. High tensile strength fibers should be used.

It goes without saying that acceptable fibers must have a tensile strength larger than that of the matrix. There are provided different kinds of carbon fibers of which tensile strength is mainly varied depending upon the manufacturing method. Carbon fibers with a tensile strength of about 50 to 300 kg/mm² are actually produced and traded. It is natural that the aluminum composite material reinforced with carbon fibers must be manufactured under such conditions that the carbon fibers are not deteriorated in order not to lower the high tensile strength. Since the melting point of aluminum is about 660°C, the composite material is manufactured at a temperature higher than 660°C but lower than a temperature at which the carbon fibers are deteriorated and thereby become brittle.

4. There should be a small difference in coefficients of thermal expansion between the matrix and the carbon fibers.

Since a large difference in coefficient of thermal expansion damages the interface adherence between the matrix and fiber, it must be small. The difference in coefficient between aluminum and carbon fibers is small and not sufficiently large to harm the adherence therebetween.

Among these requirements the most important one is wettability when the matrix is aluminum or its alloys and the reinforcing fiber is carbon fiber.

It is an object of the present invention to provide a novel carbon fiber-reinforced aluminum composite adherence between the matrix and the fiber.

The present invention is based upon such a discovery that the wettability between the aluminum and carbon fibers can be improved by providing a carbide layer to the surfaces of the carbon fibers.

The present invention, therefore, provides a carbon fiber-reinforced aluminum composite material comprising an aluminum matrix and carbon fibers buried in the matrix which has a tensile strength larger than that of the matrix, the surfaces of the carbon fibers being coated with such a carbide layer having a good affinity for the matrix.

Other objects and features and advantages of the present invention will be apparent from the following detailed description, taken in conjunction with the drawing, in which:

FIG. 1 is a graph showing standard free energy change for a carbide forming reaction; and FIG. 2 is a microscopic photograph showing a sectional microstructure of carbon fiber-reinforced aluminum composite material according to the present invention.

In order to form carbide on the surface of the carbon fibers, an element reactive with carbon is added to the aluminum matrix to prepare an aluminum alloy. In this method the alloying element does not always serve as an element for improving or changing the mechanical or other physical properties of aluminum. In another process the element reactive with carbon is added by such a manner that fine ribbons or powder of the element is put together with the carbon fibers between a plurality of aluminum plates, and the plates are pressed and heated to bond them tightly and to react the element with carbon so as to form carbide.

Aluminum can also react with carbon to form a carbide at relatively high temperatures, such as 1,100°C or more, according to the reaction $4Al + 3C \rightarrow Al_4C_3$. Although the carbide $Al_4C_3$ has a good wettability with aluminum, it is very brittle. Since the formation of $Al_4C_3$ goes on rapidly at the high temperature, it is difficult to control the formation of $Al_4C_3$ during the manufacturing of the composite material by heating. As a result that all the carbon fibers are converted to $Al_4C_3$, the composite material produced becomes very brittle. In view of the above, the carbide should be formed only on the surfaces of the carbon fibers.

It is also required that the element reactable with carbon must have the reactivity with carbon greater than that with aluminum. The discrimination of reaction rate of carbide formation can be based on the standard free energy change ($\Delta G°$) upon forming carbide by reaction of the element added and carbon fiber.

FIG. 1 shows standard free energy change ($\Delta G°$) of carbide forming elements during reaction, indicating that an element having a negative ($\Delta G°$) and larger absolute value thereof promotes the reaction more easily. In other words, acceptable elements are preferably selected from ones which have a standard free energy change smaller than that of aluminum at a temperature of 1,100°C or less. The present inventors have, however, found that almost all of the elements having a negative standard free energy change provide desired reinforcing properties, even if the change is slightly larger than that of aluminum.

According to FIG. 1, it will be apparent that acceptable elements are Cr, Ce, V, U, Th, Nb, Si, Mo, $Fe^{(+3)}$, Ta, Ti, Zr, W, Hf, $Co^{(+4)}$ and Mn.

As stated above, since the formation of $Al_4C_3$ is not desired, the manufacturing process of the composite material is preferably carried out at temperatures at which carbon does not react with aluminum, i.e., at temperatures of 1,100°C or less. The present inventors have found that 1,000°C is preferable as a manufacturing temperature in order to avoid the undesirable carbon-aluminum reaction. Therefore, the amount of the elements added to the aluminum matrix is determined by consideration of the melting point of alloys containing such elements. The element should be added in such an amount that substantially all the surfaces of carbon fibers are covered with a thin carbide film forced by reaction of the element added with carbon. According to the inventors' calculations, about $3 \times 10^{-6}$ mole per one cubic centimeter of the carbon fibers is the minimum amount of the element, assuming that the molecular film is formed on the surfaces of the carbon fibers. The maximum amount of element is determined by the melting point of the aluminum matrix containing the element. Since the melting point increases with the amount of element, the maximum amount is limited by the melting point of the matrix. The addition of the element in such an amount that the melting point of the matrix is higher than the temperature at which the reaction of aluminum and carbon extensively takes place should be avoided. For example, aluminum alloys having a melting point lower than 1,000°C are: Zr (2% or less by weight) — Al, Ti (5% or less) — Al, Cr (18% or less) — Al, V (5% or less) — Al, Nb (12% or less) — Al, Mo (1% or less) — Al and Fe (16% or less) — Al.

The adjustment of the amount of the element to be added can control the amount of carbon fibers reacting therewith. Also, the carbide layer formed can provide a barrier for controlling the reaction between aluminum and carbon fiber.

In order to minimize the reaction of aluminum matrix and carbon fiber, an element having negative and larger absolute value of standard free energy change ($\Delta G°$) upon reacting than those materials should be employed.

In order to obtain the carbon fiber-reinforced composite aluminum material of this invention, it is desirable that aluminum is initially alloyed with the carbide forming element. When oriented carbon fibers are immersed into the molten alloy, the reaction of the added element and carbon fibers immediately takes place to form carbide and to reinforce the composite material.

By laminating a plurality of units, such as plates of aluminum having carbon fibers and additive elements together arranged thereon and sealing ends of the lamination to prevent the oxidation of carbon fibers by atmosphere, and then heating, reaction between the carbon fibers and additive element can be effected.

In this case, covering of entire carbon fibers with the additive element is preferable in order to suppress the reaction of aluminum and carbon fibers.

The matrix may be an alloy containing an element such as copper which does not form carbide. Also in this case, the existence of a carbide layer as described above can provide the wettability between the aluminum alloy matrix and carbon fibers.

DESCRIPTION OF PREFERRED EMBODIMENTS

The principles and unique aspects of this invention will become more apparent by reference to the following examples which are intended to be illustrative but not limitative of the invention:

EXAMPLE 1

An alloy consisting of aluminum containing titanium of 0.5% by weight was heated to 800°C in a vacuum chamber having a pressure of 2 to $5 \times 10^{-6}$ mmHg and held at molten state. On the other hand, carbon fibers each having a tensile strength of 250 kg/mm$^2$ and having a cross section of elliptical shape with a major diameter of $9\mu$ and a minor diameter of $4\mu$ were bundled and charged in parallel into an alumina pipe with one end thereof closed, which was then placed in said vacuum chamber to heat it, thereby the carbon fibers being subjected to degassing treatment.

Then, the alumina pipe with 2 cm of inner diameter and 15 cm of length containing the carbon fibers with its open end down was immersed into the aluminum-titanium alloy bath maintained at molten state, and thereafter, argon gas was introduced into the vacuum chamber to establish a pressure of 1 atmosphere in the chamber.

The molten aluminum-titanium alloy was pushed up to fill the gaps between carbon fibers, and at the same time, surface of the carbon fibers and titanium reacted to form the titanium carbide TiC. The carbon fiber content of the carbon fiber reinforced composite aluminum material thus obtained in the alumina pipe was 33 percent by volume. The amount of titanium was about $2 \times 10^{-4}$ made per one cubic centimeter of carbon fibers.

Figure 1:
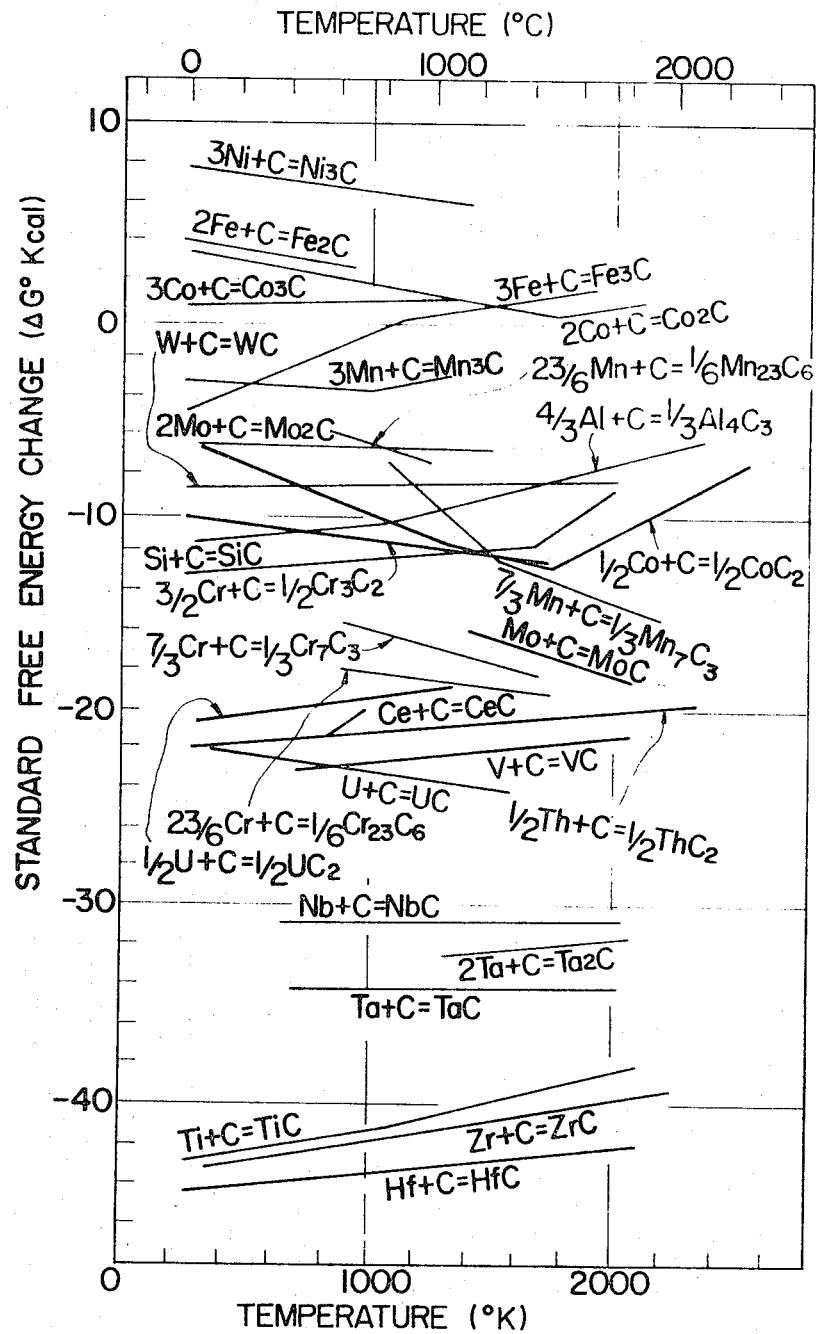
Figure 2:

FIG. 2 shows a microstructure of cross section perpendicular to the direction of orientation of the carbon fibers in the carbon fiber reinforced composite aluminum material thus obtained, the black particles dispersed being carbon fibers. The tensile strength of the composite was 79 kg/mm². Since the tensile strength of pure aluminum casting is about 10 kg/mm², the present invention enhances the tensile strength to about 8 times.

EXAMPLE 2

A carbon fiber-reinforced aluminum composite material containing zirconium of 0.5% by weight in place of titanium to provide wettability was produced in the same manner as Example 1, except that the carbon fiber content was 25 percent by volume. The amount of zirconium was about $1 \times 10^{-4}$ mole per cubic centimeter. The tensile strength of this composite was 50 kg/mm².

EXAMPLE 3

A carbon fiber-reinforced composite aluminum material containing chromium of 1 percent by weight as carbide forming element was produced in the same procedures as Example 1, whereby the holding temperature of the aluminum alloy bath was 750°C and the carbon fiber content was 50 percent by volume. The tensile strength of this composite material was 115 kg/mm².

EXAMPLE 4

An alloy consisting of aluminum containing titanium of 0.5 percent by weight was heated to 800°C in a vacuum chamber having a pressure of 2 to $5 \times 10^{-6}$ mm Hg and held at molten state.

On the other hand, carbon fibers each having a cross section of elliptical shape with a major diameter of $9\mu$ and a minor diameter of $4\mu$ were bundled and charged in parallel into an alumina pipe with its both ends open. The pipe was then connected to a vacuum pump through a fixture at one end thereof and placed in the vacuum chamber to heat it, thereby the carbon fibers being subjected to degassing treatment.

Then, the alumina pipe containing the carbon fibers, with the end not connected to the vacuum system down, was immersed into the aluminum-titanium alloy bath maintained at molten state, and thereafter argon gas was introduced into the vacuum chamber to establish a pressure of 1 to 10 mmHg in the chamber. By this time, the alumina pipe containing the carbon fibers had been exhausted of gas by the vacuum pump connected to the upper end of the pipe to maintain a pressure of 2 to $8 \times 10^{-6}$ mmHg therein.

The molten aluminum-titanium alloy was sucked up into the alumina pipe to fill the gaps between carbon fibers, and at the same time, surface of the carbon fibers and titanium reacted to form the titanium carbide TiC. The carbon fiber content of the carbon fiber-reinforced aluminum composite material produced in the alumina pipe was 37 percent by volume. The tensile strength of the composite was 81 kg/mm².

As it is clear from the above Examples, the present invention provides a particularly unique composite aluminim material reinforced with carbon fibers.

Since the carbon fiber has a higher heat resistance and a lower specific gravity, and is of lower cost thereby making it suitable for mass production than the boron fiber, the success in utilizing this carbon fiber for reinforcement of aluminum is very significant. Also, in view of the fact that in the field of aircraft, the decrease of specific gravity of the material to be used is matter to be taken into consideration. The material of this invention is most suitable for meeting this requirement.

It is generally recognized that the mechanical strength, especially a tensile strength of composite material with fibers which are not oriented to one direction is one third to one fifth of that of composite material with fibers oriented to one direction. It is, therefore, preferable that all the carbon fibers in the aluminum matrix are oriented to one direction, i.e., the same direction. It will be understood that the present invention should not be limited to this orientation.

While the novel principles of the invention have been described, it will be understood that various omissions, modifications and changes in these principles may be made by one skilled in the art without departing from the spirit and scope of the invention.

What we claim is:

1. A carbon fiber-reinforced aluminum composite material comprising an aluminum containing matrix with at least one alloying element which is reactive with carbon and carbon fibers embedded in said matrix that have a tensile strength larger than that of said matrix, the amount of said carbon fibers being larger than the critical volume ratio required to reinforce said matrix and the surfaces of said carbon fibers being substantially covered with a thin carbide film formed by reaction of said element with carbon, said carbide film being in direct contact with said matrix so that said carbon fibers intimately adhere to said matrix.

2. The carbon fiber-reinforced aluminum composite material according to claim 1, wherein said alloying element has a negative value of standard free energy change upon reacting with the carbon fibers.

3. The carbon fiber-reinforced aluminum composite material according to claim 1, wherein said containing matrix with containing said alloying element has a melting point lower than the temperature at which aluminum reacts with carbon.

4. The carbon fiber-reinforced aluminum composite material according to claim 2, wherein said element has a negative value of standard free energy change upon reacting with the carbon fibers and also has an absolute value greater than that of standard free energy change in the reaction of aluminum and carbon fibers.

5. The carbon fiber reinforced aluminum composite material according to claim 2, wherein said element includes Cr, Ce, V, U, Th, Nb, Si, Mo, $Fe^{(+3)}$, Ta, Ti, Zr, W, Hf, $Co^{(+4)}$ and Mn.

6. A carbon fiber-reinforced aluminum composite material comprising an aluminum containing matrix with at least one alloying element reactive with said carbon and carbon fibers embedded in said matrix having a tensile strength larger than that of said matrix, said carbon fibers being oriented in one direction, the amount of said carbon fibers being larger than the critical volume ratio required for reinforcement of said matrix but smaller than such an amount that no gaps between fibers which are not filled with aluminum are left, and the surfaces of said carbon fibers are substantially covered with a thin carbide matrix film formed by reaction of said element with carbon, said carbide film being in direct contact with said matrix to produce an intimate adherence between said matrix and said carbon fibers.

7. The carbon fiber-reinforced aluminum composite material according to claim 6, wherein an amount of said element is larger than about $3 \times 10^{-6}$ mole per one cubic centimeter of said carbon fiber but smaller than such an amount that the melting point of said matrix containing said element is lower than about 1,100°C.

8. The carbon fiber-reinforced aluminum composite material according to claim 7, wherein the amount of alloying element is smaller than an amount such that the melting point of the matrix containing said element is lower than about 1,000°C.

9. The carbon fiber-reinforced aluminum composite material according to claim 8 wherein the carbon fibers have a tensile strength of from about 50 to 300 Kg/mm².

10. A carbon fiber-reinforced aluminum composite material comprising a matrix of an aluminum alloy containing at least one alloying element which is reactive with carbon and carbon fibers embedded in said matrix that have a tensile strength larger than that of said matrix, the amount of said carbon fibers being larger than the critical volume ratio required to reinforce said matrix and the surfaces of said carbon fibers being substantially covered with a thin carbide film formed by reaction of said element with carbon, said carbide film being in direct contact with said matrix so that said carbon fibers intimately adhere to said matrix.

11. The carbon fiber-reinforced aluminum composite material according to claim 10, wherein said alloying element has a negative value of standard free energy change upon reacting with the carbon fibers.

12. The carbon fiber-reinforced aluminum composite material according to claim 10, wherein said containing matrix with said alloying element has a melting point lower than the temperature at which aluminum reacts with carbon.

13. The carbon fiber-reinforced aluminum composite material according to claim 11, wherein said element has a negative value of standard free energy change upon reacting with the carbon fibers and also has an absolute value greater than that of standard free energy change in the reaction of aluminum and carbon fibers.

14. The carbon fiber-reinforced aluminum composite material according to claim 10, wherein an amount of said element is larger than about $3 \times 10^{-6}$ mole per one cubic centimeter of said carbon fiber but smaller than such an amount that the melting point of said matrix containing said element is lower than about 1,100° C.

15. The carbon fiber-reinforced aluminum composite material according to claim 14, wherein the amount of alloying element is smaller than an amount of such that the melting point of the matrix containing said element is lower than about 1,000° C.

16. The carbon fiber-reinforced aluminum composite material according to claim 1, wherein said aluminum containing matrix includes an aluminum matrix and an aluminum alloy matrix with said at least one alloying element being uniformly disposed in said alloy matrix, said alloy matrix contacting said carbon fibers.

17. The carbon fiber-reinforced aluminum composite material according to claim 16, wherein said alloying element has a negative value of standard free energy change upon reacting with the carbon fibers.

18. The carbon fiber-reinforced aluminum composite material according to claim 16, wherein said containing matrix with said alloying element has a melting point lower than the temperature at which aluminum reacts with carbon.

19. The carbon fiber-reinforced aluminum composite material according to claim 18, wherein said element has a negative value of standard free energy change upon reacting with the carbon fibers and also has an absolute value greater than that of standard free energy change in the reaction of aluminum and carbon fibers.

20. The carbon fiber-reinforced aluminum composite material according to claim 16, wherein an amount of said element is larger than about $3 \times 10^{-6}$ mole per one cubic centimeter of said carbon fiber but smaller than such an amount that the melting point of said matrix containing said element is lower than about 1,100° C.

21. The carbon fiber-reinforced aluminum composite material according to claim 20, wherein the amount of alloying element is smaller than an amount of such that the melting point of the matrix containing said element is lower than about 1,000° C.

22. The carbon fiber-reinforced aluminum composite material according to claim 15, wherein aluminum alloy matrix is one of up to 2% Zr - Al, up to 12% Nb - Al, up to 1% Mo - Al or up to 16% Fe - Al.

23. The carbon fiber reinforced aluminum composite material according to claim 21, wherein aluminum alloy matrix is one of up to 2% Zr - Al, up to 5% Ti - Al, up to 18% Cr - Al, up to 5% V - Al, up to 12% Nb - Al, up to 1% Mo - Al or up to 16% Fe - Al.

* * * * *